(12) United States Patent
Sensut (10) Patent No.: US 6,430,375 B2
(45) Date of Patent: Aug. 6, 2002

(54) FINDER OPTICAL SYSTEM

(75) Inventor: Takayuki Sensut, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,713

(22) Filed: Mar. 30, 2001

(30) Foreign Application Priority Data

Apr. 6, 2000 (JP) .................................. 2000-104853

(51) Int. Cl.[7] .......................... G03B 13/06; G03B 13/02
(52) U.S. Cl. ................................. 396/382; 396/384
(58) Field of Search ........................ 396/382, 384, 396/385, 386

(56) References Cited

U.S. PATENT DOCUMENTS

| | | | |
|---|---|---|---|
| 4,171,888 A | | 10/1979 | Shono et al. ............... 396/384 |
| 4,592,636 A | * | 6/1986 | Kato et al. ................. 396/384 |
| 4,910,545 A | * | 3/1990 | Fujibayashi et al. ......... 396/384 |
| 6,035,145 A | * | 3/2000 | Kanai ........................ 396/384 |
| 6,314,246 B1 | * | 11/2001 | Ozaki et al. ................ 396/384 |

* cited by examiner

Primary Examiner—Christopher Mahoney
(74) Attorney, Agent, or Firm—Greenblum & Bernstein, P.L.C.

(57) ABSTRACT

Disclosed is a finder optical system that is provided with a relay optical system that forms a second image by erecting an inverted first image formed on a first image plane through a taking lens of a camera, and a magnifying optical system through which the second image is observed under magnification. The relay optical system includes a condenser lens, a reflecting prism and a relay lens arranged in the order from the first image plane toward an eyepoint. The following conditions (1) and (2) are satisfied;

(1) $0.25 < |m_r| < 0.35$
(2) $0.75 < f_2/f_3 < 0.85$ where, $m_r$ is magnification of the relay optical system, $f_2$ is a focal length of the relay lens, and $f_3$ is a focal length of the magnifying optical system.

4 Claims, 7 Drawing Sheets

SPHERICAL ABERRATION
CHROMATIC ABERRATION

FIG.3A

ASTIGMATISM

FIG.3B

DISTORTION

SPHERICAL ABERRATION
CHROMATIC ABERRATION

FIG.5A

ASTIGMATISM

FIG.5B

DISTORTION

SPHERICAL ABERRATION
CHROMATIC ABERRATION

FIG. 7A

ASTIGMATISM

FIG. 7B

DISTORTION

SPHERICAL ABERRATION
CHROMATIC ABERRATION

FIG.9A

ASTIGMATISM

FIG.9B

DISTORTION

SPHERICAL ABERRATION
CHROMATIC ABERRATION

FIG.11A

ASTIGMATISM

FIG.11B

DISTORTION

FINDER OPTICAL SYSTEM

BACKGROUND OF THE INVENTION

The present invention relates to a finder optical system of a single-lens reflex camera, and more specifically, to a finder optical system that is suitable for a medium-format camera to which a film back is attached.

In general, a single-lens reflex (SLR) camera for a 35 mm film employs a pentaprism finder that has a pentaprism as an erecting optical system. A finder window, which is the last optical surface of the finder optical system, is positioned to be coincident with a back surface of a camera body in the finder of the SLR camera for a 35 mm film.

On the other hand, the pentaprism finder may not be suitable for a medium-format SLR camera that uses a Brownie film whose width is 61.5 mm. When a medium-format SLR camera employs an exchangeable film back, the film back is jutted over the back surface of the camera body. If such a camera is provided with the pentaprism finder, an eye relief becomes too large to observe an object through the finder.

U.S. Pat. No 4,171,888 discloses a finder optical system that consists of a relay optical system employing a trapezoidal prism, and a magnifying optical system. The relay optical system forms a second image by erecting an inverted first image formed on a focusing screen (a first image plane) through a taking lens of a camera. The second image is observed through the magnifying optical system under magnification.

In general, a ratio of a viewing area of a finder to an image area on a film, which is referred to as a finder viewing ratio, and a finder magnification, which represents a size of an observed image, are important factors to design the finder optical system. It is preferable that the finder viewing ratio and the finder magnification are large as possible. However, it is difficult to increase the finder viewing ratio and the finder magnification in balance for the finder employing a trapezoidal prism. That is, when sizes of incident and exit surfaces of the trapezoidal prism are designed to be large in order to increase the finder viewing ratio, the total optical path length in the prism becomes too large to keep the appropriate finder magnification.

SUMMARY OF THE INVENTION

It is therefore an object of the present invention to provide an improved finder optical system that is capable of increasing the finder viewing ratio and the finder magnification in balance, assuming that the finder optical system includes a relay optical system that forms a second image by erecting an inverted first image formed on the first image plane and a magnifying optical system through which the second image is observed under magnification.

For the above object, according to the invention, there is provided a finder optical system that is provided with a relay optical system that forms a second image by erecting an inverted first image formed on a first image plane through a taking lens of a camera, and a magnifying optical system through which the second image is observed under magnification. The relay optical system includes a condenser lens, a reflecting prism and a relay lens arranged in the order from the first image plane toward an eyepoint. The following conditions (1) and (2) are satisfied;

(1) $0.25 < |m_r| < 0.35$ (2) $0.75 < f_2/f_3 < 0.85$ where $m_r$ is magnification of the relay optical system, $f_2$ is a focal length of the relay lens, and $f_3$ is a focal length of the magnifying optical system.

The relay lens may include at least one positive lens and at least one negative lens that are arranged in the order from the second image plane toward the taking lens, and wherein the following condition (3) is satisfied;

(3) $1.3 < |f_2/f_{2n}| < 2.5$.

The symbol $f_{2n}$ is a focal length of the negative lens that is the closest to the second image plane in the relay lens. When the closest negative lens consists of a plurality of negative lens elements, the symbol $f_{2n}$ represents a resultant focal length of the plurality of negative lens elements.

The magnifying optical system may include at least one positive lens and at least one negative lens that are arranged in the order from the second image plans toward an eyepoint, and wherein the following condition (4) is satisfied;

(4) $0.7 < |f_3/f_{3n}| < 1.5$.

The symbol $f_{3n}$ is a focal length of the negative lens that is the closest to the second image plane in the magnifying optical system. When the closest negative lens consists of a plurality of negative lens elements, the symbol $f_{3n}$ represents a resultant focal length of the plurality of negative lens elements.

Further, the reflecting prism may be a trapezoidal prism.

DETAILED DESCRIPTION OF THE PREFERRED EMBODIMENTS

Figure 1:
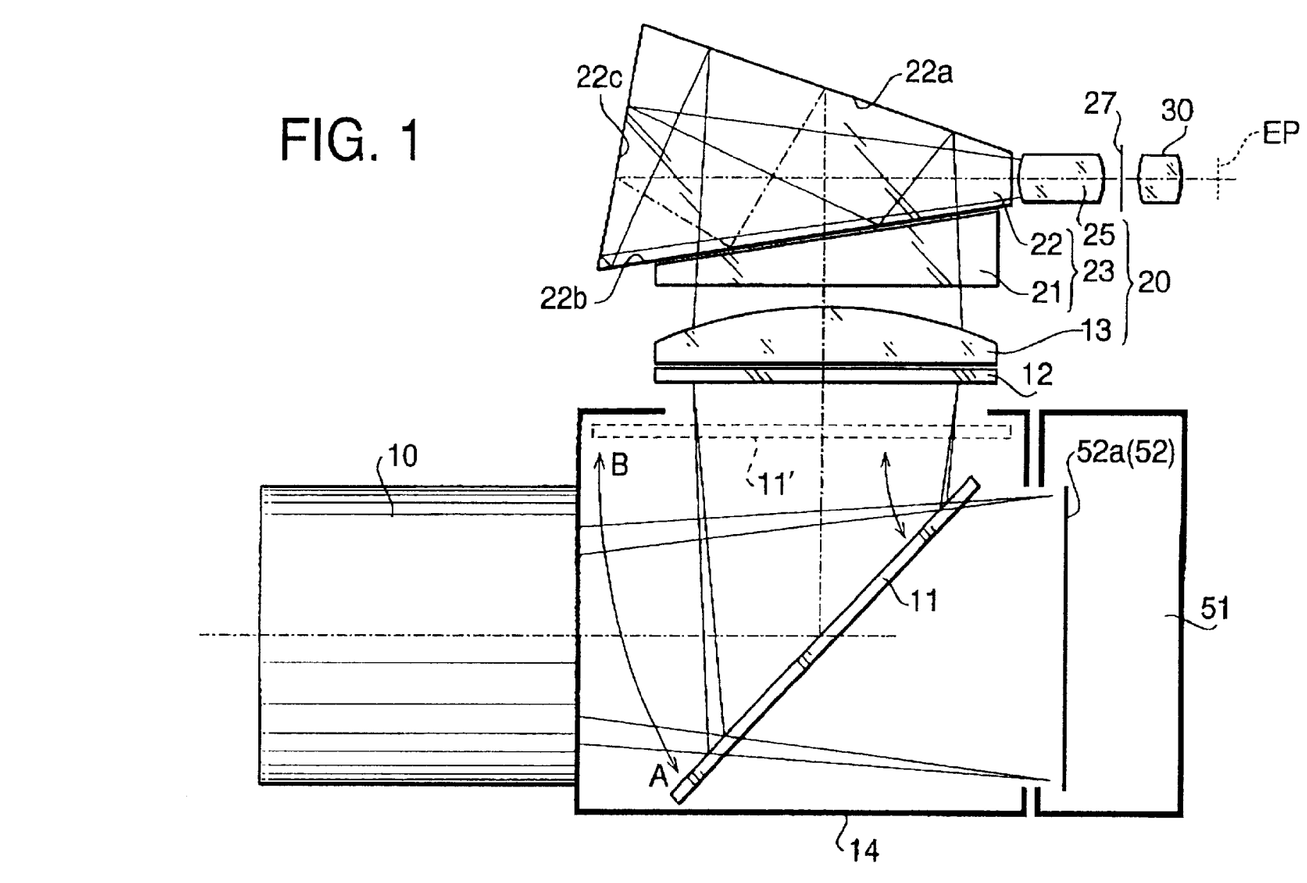
FIG. 1 shows an arrangement of optical elements in a medium-format SLR camera embodying the present invention.

Finder optical systems embodying the present invention will be described hereinafter. FIG. 1 shows an arrangement of optical elements in a medium-format SLR camera embodying the present invention. The SLR camera is provided with a taking lens, (a taking optical system) 10, a main reflex mirror 11 supported in a mirror box 14, and a finder optical system that consists of a relay optical system 20 and a magnifying optical system 30. A film back 51 in which a film 52 is loaded is attached to rear portion of the mirror box 14.

The main reflex mirror 11 is in the position A as illustrated by the solid line in FIG. 1 when the film 52 is not exposed. When the film 52 Is exposed, the main mirror 11 jumps to the position B as illustrated by the dotted line. As a result, when the main mirror is in the position A, the light from an object passing through the taking lens 10 is reflected by the main reflex mirror 11 and forms a first image on a focusing screen 12 that is located at an optically equivalent position to the film surface 52*a*. On the other hand, when the main reflex mirror 11 is in the position B, the light from an object can expose the film 52.

The relay optical system 20 consists of a condenser lens 13, a trapezoidal prism 23 and a relay lens 25 that are arranged in the order from the focusing screen 12 toward the eyepoint EP. The trapezoidal prism 23 is composed of a first prism 21 and a second prism 22. The reflected light from the main reflex mirror 11 passes through the first Prism 21 and is reflected by first, second and third reflecting surfaces 22*a*, 22*b* and 22*c* of the second prism 22. The light exited from the second prism 22 is incident on the relay lens 25. An inverted first image formed on the focusing screen 12 is erected by means of the trapezoidal prism 23 and the relay lens 25 to form a second image on a second image plane 27. That is, the relay optical system 20 that consists of the condenser lens 13, the trapezoidal prism 23 and the relay lens 25 has a function of an erecting optical system. The second image formed on the second image plane 27 is observed through the magnifying optical system 30 under magnification.

As described above, the finder viewing ratio and the finder magnification are important factors to design a finder optical system of a SLR camera. The finder viewing ratio is defined as a ratio of a viewing area of a finder to an image area on the film surface 52*a*, and it is preferable that the viewing area is coincident with the image area (i.e., the finder viewing ratio is 100%). In order to achieve 100% finder viewing ratio, the area of the focusing screen 12 should be equal to or larger than the image area on the film surface 52*a* and the erecting optical system (i.e., the relay optical system 20) is required to keep enough areas for each of incident, reflecting and exit surfaces. However, such a design enlarges size of the trapezoidal prism 23, which increases the size of the prism and the total optical path length in the prism, decreasing the finder magnification.

Figure 12:
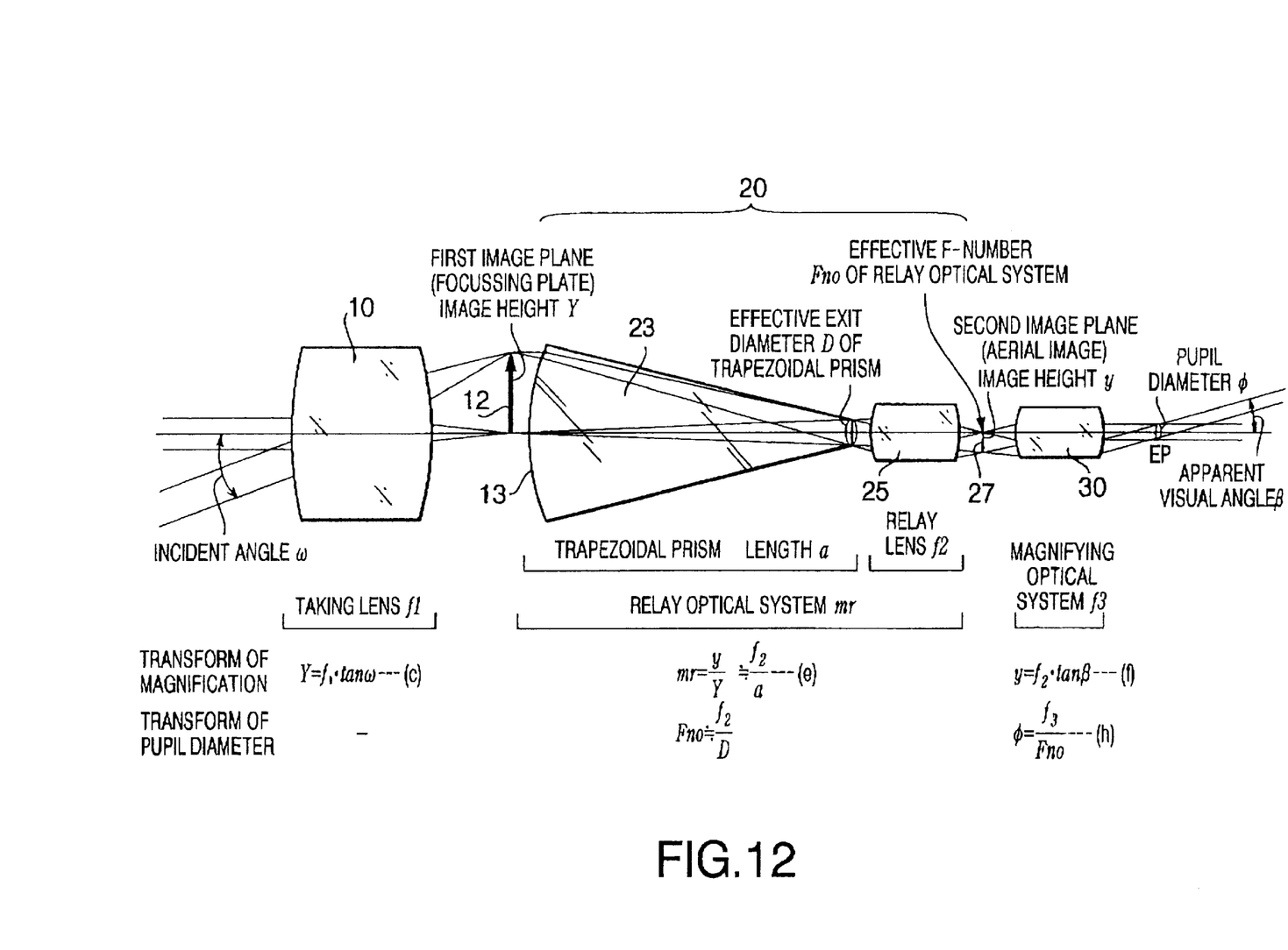
FIG. 12 is a developed view of the finder embodying the present invention to show transform of magnification and transform of pupil diameter.

The finder optical system embodying the present invention increases the finder viewing ratio and the finder magnification in balance according to the following configuration. The configuration will be described with reference to FIG. 12. FIG. 12 Is a developed view of the finder embodying the present invention to show transform of magnification and transform of pupil diameter.

The finder magnification M is given by the equation (a);

$$M = \frac{\tan\beta}{\tan\omega} \quad (a)$$

where ω is an incident angle to the taking lens 10 and β is an exit angle from the magnifying optical system 30. The angle β is also equal to an apparent visual angle. Since the finder magnification M Varies according to the focal length $f_1$ of the taking lens 10, it is not suitable to define the finder optical system itself. Therefore, a screen-to-eyepoint magnification $\beta_0$ is used instead of the finder magnification M in the-following description. The screen-to-eyepoint magnification $\beta_0$ is a ratio of an apparent image height at the eyepoint EP to an image height Y on the focusing screen 12 as shown by the equation (b);

$$\beta_0 = \frac{\tan\beta}{Y} \quad (b)$$

The image height Y is given by the equation (c) and the finder magnification is found from the screen-to-eyepoint magnification $\beta_0$ and the focal length $f_1$ as shown by the equation (d).

$$Y = f_1 \times \tan\omega \quad (c)$$

$$M = f_1 \times \frac{\tan\beta}{Y} = f_1 \times \beta_0 \quad (d)$$

Assuming that the focal length f1 is constant, the larger the screen-to-eyepoint magnification $\beta_0$ is, the larger the finder magnification M is.

In the finder optical system including the relay optical system 20, a magnification $m_r$ of the relay optical system 20 and a height y of the image on the second image plane 27 are given by the following equations (e) and (f), respectively:

$$m_r = y/Y \quad (e)$$

$$y = f_3 \times \tan\beta \quad (f)$$

where
$f_3$: a focal length of the magnifying optical system 30.
The equations (b), (e) and (f) lead to $$\beta_0 = \frac{m_r}{f_3} \quad (g)$$

Namely, the screen-to-eyepoint magnification $\beta_0$ that is a ratio of the apparent image height to the height of the image on the first image plane is determined by the magnification $m_r$ of the relay optical system 20 and the focal length $f_3$ of the magnifying optical system 30. Therefore, the screen-to-eyepoint magnification $\beta_0$ increases as the magnification $m_r$ becomes larger or the focal length $f_3$ becomes shorter.

The magnification $m_r$ can be approximated by $f_2/a$, where $f_2$ is a focal length of the relay lens 25 and a is the total length (optical path length) of the trapezoidal prism 23. Assuming that the total length a of the trapezoidal prism 23 is constant, the magnification $m_r$ of the relay optical system 2C Is determined by the focal length $f_2$ of the relay lens 25. Therefore, the longer the focal length $f_2$ is, the larger the magnification $m_r$ of the relay optical system 20 is.

When the finder optical system includes the trapezoidal prism 23 and the relay lens 25, a pupil diameter φ at the eyepoint EP is given by the equation (h);

$$\phi = \frac{f_3}{F_{NO}} \quad (h)$$

where $F_{NO}$ is effective F-number of the relay optical system 20.

The equation (h) shows that the pupil diameter φ increases as the F-number $F_{NO}$ of the relay optical system 20 becomes smaller or the focal length $f_3$ of the magnifying optical system 30 becomes larger. The F-number $F_{NO}$ of the relay optical system 20 becomes smaller as the focal length $f_2$ of the relay lens 25 becomes shorter.

Further, the equations (g) and M lead to $$\beta_0 \cdot \phi = \frac{m_r}{F_{NO}} \quad (i)$$

and the equation (i) shows that the high magnification $m_r$ and the small F-number $F_{NO}$ are required for the relay optical system 20 In order to balance the requirements of the high screen-to-eyepoint magnification $\beta_0$ and the large pupil diameter $\phi$ under the high finder viewing ratio.

According to the above-described analysis, the focal length $f_2$ of the relay lens 25 should be longer or the focal length $f_3$ of the magnifying optical system should be shorter in order to increase the screen-to-eyepoint magnification $\beta_0$. In the same manner, the large pupil diameter $\phi$ requires the short focal length $f_2$ or the long focal length $f_3$. Therefore, it is important to balance the focal lengths $f_2$ and $f_3$ to satisfy these contradictory requirements.

The finder optical system embodying the present invention satisfies the following conditions (1) and (2) to obtain the high screen-to-eyepoint magnification $\beta_0$ and the large pupil diameter $\phi$ under the high finder viewing ratio.

(1) $0.25 < |m_r| < 0.35$
(2) $0.75 < f_2/f_3 < 0.85$

The condition (1) defines the magnification of the relay optical system 20. If the absolute value of the magnification becomes smaller than the lower limit, the screen-to-eyepoint magnification $\beta_0$ becomes too small. On the other hand, if the absolute value of the magnification becomes larger than the upper limit, while the screen-to-eyepoint magnification $\beta_0$ becomes large, the pupil diameter $\phi$ becomes too small because of the increasing of the F-number of the relay optical system 20.

The condition (2) shows a ratio of the focal length of the relay lens 25 to the focal length of the magnifying optical system 30, and it defines a balance between the screen-to-eyepoint magnification $\beta_0$ and the pupil diameter $\phi$. If the ratio becomes smaller than the lower limit, while the pupil diameter becomes large enough, the screen-to-eyepoint magnification $\beta_0$ becomes too small. On the other hand, if the ratio becomes larger than the upper limit, while the screen-to-eyepoint magnification $\beta$ becomes large enough, the pupil diameter $\phi$ becomes too small.

Since the finder optical system of the present invention is designed to have long focal lengths for both of the relay optical system 20 and the magnifying optical system 30, the lengths of the respective optical systems becomes large, which increases the total length of the finder optical system. Further, if the pupils of the relay lens 25 and the magnifying optical system 30 are not coincident with each other, a shadow area is generated in the exit pupil, which reduces viewability of the finder optical system. Therefore, it is preferable that the relay lens 25 and the magnifying optical system 30 are close to be a telecentric system by arranging positive lenses having function of condenser lens at the both sides of the second image plane 27. When the relay lens 25 and the magnifying optical system 30 are close to a telecentric system, the finder optical system resists occurrence of a shadow area even if the diopter is adjusted. Further, the short total length requires the finder optical system to be close to a telephoto type. For this purpose, the relay optical system 20 and the magnifying optical system 30 should include negative lenses to increase telephoto ratios. The respective negative lenses preferably satisfy the following conditions (3) and (4).

(3) $1.3 < |f_2/f_{2n}| < 2.5$.
(4) $0.7 < |f_3/f_{3n}| < 1.5$.

The symbol $f_{2n}$ id a focal length of the negative lens that is the closest to the second image plane 27 in the relay optical system 20. When the closest negative lens consists of a plurality of negative lens elements, the symbol $f_{2n}$ represents a resultant focal length of the plurality of negative lens elements. The symbol $f_{3n}$ is a focal length of the negative lens that is the closest to the second image plane in the magnifying optical system. When the closest negative lens consists of a plurality of negative lens elements, the symbol $f_{3n}$ represents a resultant focal length of the plurality of negative lens elements.

The condition (3) defines the power of the negative lens arranged in the relay lens 25. If the power of the negative lens is so weak that $|f_2/f_{2n}|$ is smaller than the lower limit, the total length becomes too long. Further, since the spherical aberration on the pupil within the relay optical system 20 becomes undercorrected, the marginal rays are directed inwardly, which causes a mismatch between the pupils. On the other hand, if the power of the negative lens is so strong that $|f_2/f_{2n}|$ is larger than the upper limit, while the total length becomes short enough, the spherical aberration on the pupil within the relay optical system 20 becomes overcorrected. As a result, the marginal rays are directed outwardly, which also causes a mismatch between the pupils.

The condition (4) defines the power of the negative lens arranged in the magnifying optical system 30. If the power of the negative lens is so weak that $|f_3/f_{3n}|$ is smaller than the lower limit, the total length becomes too long. Further, since the spherical aberration on the pupil within the magnifying optical system 30 becomes undercorrected, the marginal rays are directed inwardly, which causes a mismatch between the pupils. On the other hand, if the power of the negative lens is so strong that $|f_3/f_{3n}|$ is larger than the upper limit, while the total length becomes short enough, the spherical aberration on the pupil within the magnifying optical system 30 becomes overcorrected. As a result, the marginal rays are directed outwardly, which also causes a mismatch between the pupils.

Five numerical embodiments of the finder optical system will be described below.

First Embodiment

Figure 2:
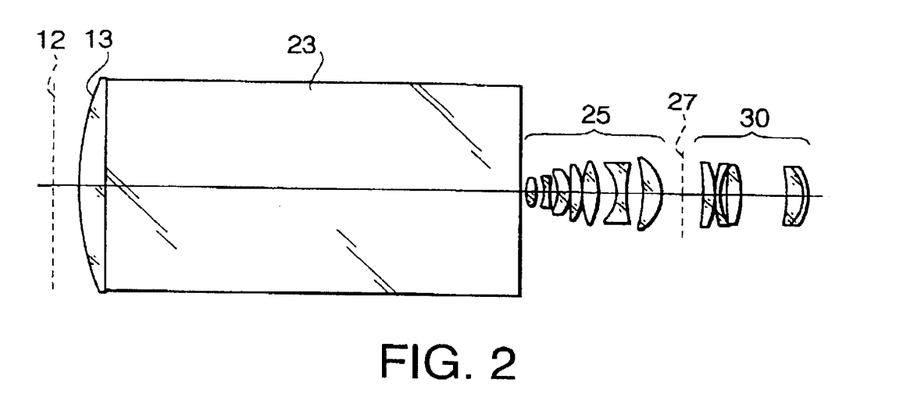
FIG. 2 is a developed view of the finder optical system according to a first embodiment.

FIG. 2 is a developed view of the finder optical system according to a first embodiment. Specific numerical arrangement of the first embodiment is indicated in Table 1. In Table 1, r represents a radius of curvature of the each surface [unit: mm], d represents a thickness of lenses or distance between lenses [unit: mm]along the optical axis, n represents a refractive index of the respective lenses at d-line (588 nm) and v represents the Abbe's number of each lens. The finder magnification shown in Table 1 is the value when the focal length of the taking lens 10 equals 75 mm.

The finder optical system of the first embodiment consists of the condenser lens 13 (surface Nos. 1 and 2), the trapezoidal prism 23 (surface Nos. 3 and 4), the relay lens 25 (surface Nos. 5 through 18) and the magnifying optical system 30 (surface Nos. 19 through 27) that are arranged from the side of the focusing screen 12. The relay lens 25 consists of positive, negative positive, positive, positive, negative and positive lens elements that are arranged from the side of the second image plane 27 toward the taking lens side. The magnifying optical system 30 consists of positive, negative, positive, positive and negative lens elements that are arranged from the side of the second image plane 27 toward the eyepoint. The positive and negative lens elements that are the closest to the eyepoint in the magnifying optical system 30 are cemented to each other. The second image plane 27 is located between the relay lens 25 and the magnifying optical system 30. The negative lens whose surface numbers are 15 and 16 is the lens defined in the condition (3), and the negative lens whose surface numbers are 21 and 22 is the lens defined in the condition (4).

TABLE 1

$f_2 = 23.445$  $f_3 = 28.489$
$f_{2n} = -13.523$  $f_{3n} = -30.644$
Finder viewing ratio: 100%
Finder magnification: 0.76
Diopter: −1.0/m

| Surface number | r | d | n | ν |
|---|---|---|---|---|
| 1 | 95.000 | 7.400 | 1.56883 | 56.3 |
| 2 | ∞ | 0.000 | — | — |
| 3 | ∞ | 115.862 | 1.56883 | 56.3 |
| 4 | ∞ | 1.500 | — | — |
| 5 | 13.727 | 2.737 | 1.72916 | 54.7 |
| 6 | −36.947 | 2.480 | — | — |
| 7 | −10.800 | 1.500 | 1.80000 | 25.7 |
| 8 | 24.042 | 2.362 | — | — |
| 9 | −12.075 | 3.664 | 1.72916 | 54.7 |
| 10 | −11.438 | 0.200 | — | — |
| 11 | −499.826 | 2.988 | 1.77250 | 49.6 |
| 12 | −22.994 | 0.200 | — | — |
| 13 | 30.525 | 4.525 | 1.77250 | 49.6 |
| 14 | −25.971 | 5.141 | — | — |
| 15 | −12.499 | 2.740 | 1.69162 | 37.0 |
| 16 | 40.483 | 4.526 | — | — |
| 17 | −71.739 | 5.403 | 1.77250 | 49.6 |
| 18 | −15.088 | 11.705 | — | — |
| 19 | −108.597 | 3.193 | 1.80000 | 50.1 |
| 20 | −32.221 | 0.368 | — | — |
| 21 | 45.671 | 1.000 | 1.80518 | 25.4 |
| 22 | 15.863 | 2.181 | — | — |
| 23 | 53.767 | 3.748 | 1.79999 | 50.9 |
| 24 | −47.346 | 13.097 | — | — |
| 25 | −46.843 | 4.742 | 1.79999 | 49.4 |
| 26 | −13.473 | 1.000 | 1.73435 | 28.6 |
| 27 | −20.933 | — | — | — |

Figure 3A:
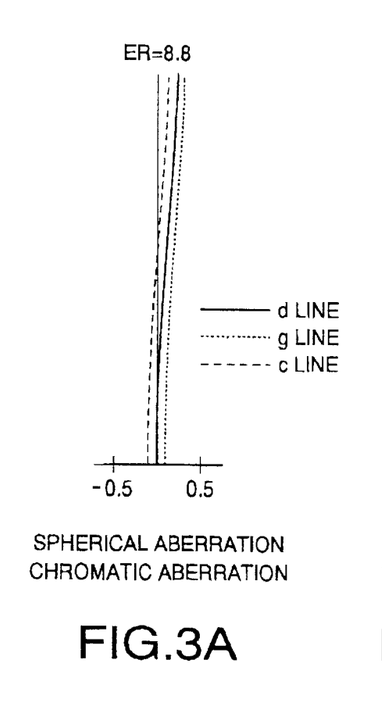
FIGS. 3A–3C are graphs showing spherical aberration, astigmatism and distortion of the finder optical system of the first embodiment, respectively.
Figure 3B:
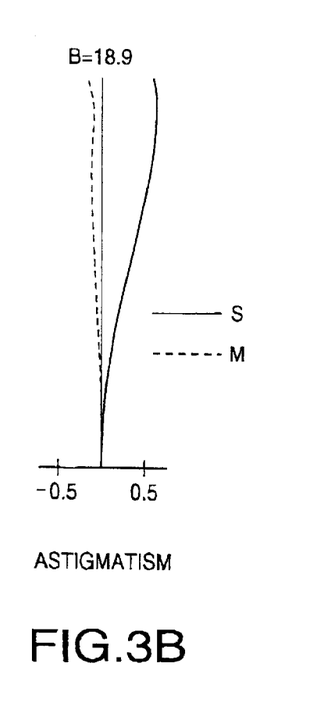
Figure 3C:
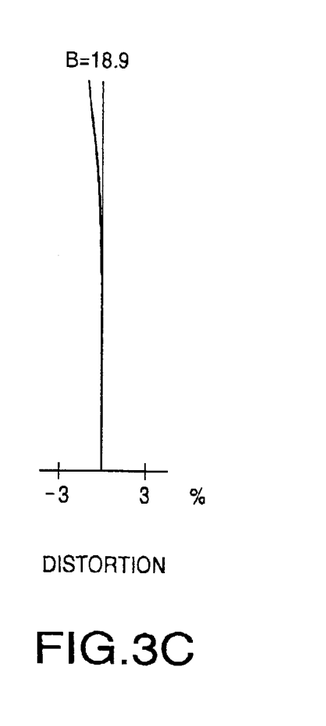

FIGS. 3A, 3B and 3C show aberrations of the finder optical system according to the first embodiment at the eyepoint. FIG. 3A shows a graph indicating spherical aberrations at d-line, g-line and C-line (unit: mm); FIG. 3B shows a graph indicating curvature of field in sagittal (S) and meridional (M) sections (unit: mm); and FIG. 3C shows a graph indicating distortion (unit: %), respectively. The differences among the curves in FIG. 3A represent longitudinal chromatic aberrations, the difference between the curves in FIG. 3B represents astigmatism. In the graphs, ER is a diameter of the exit pupil and B is the exit angle (unit: degree).

Second Embodiment

Figure 4:
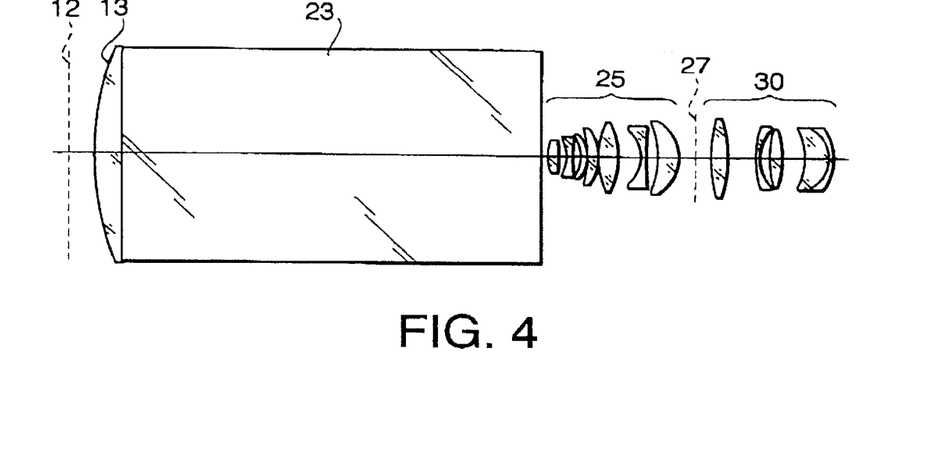
FIG. 4 is a developed view of the finder optical system according to a second embodiment.
Figure 5A:
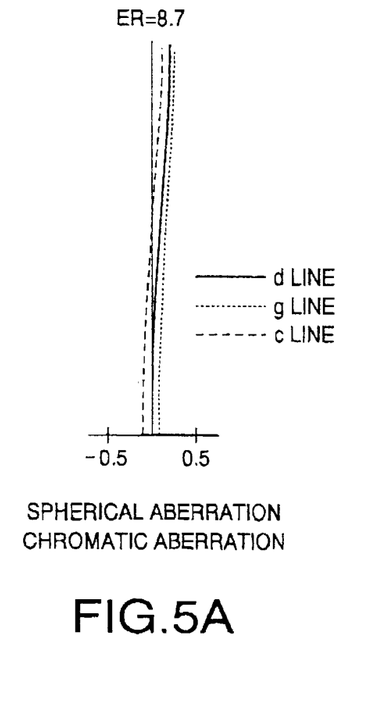
FIGS. 5A–5C are graphs showing spherical aberration, astigmatism and distortion of the finder optical system of the second embodiment, respectively.
Figure 5B:
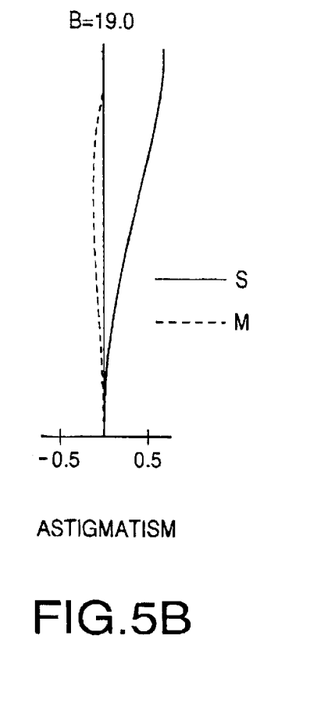
Figure 5C:
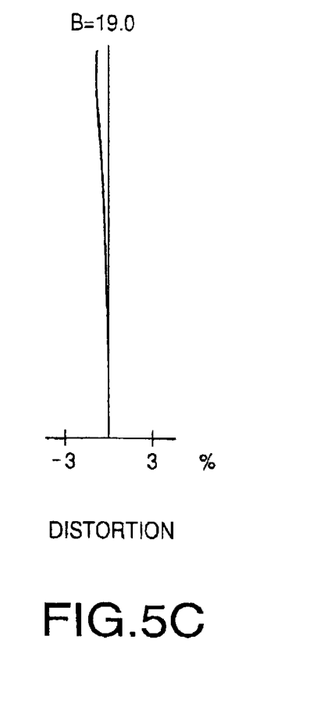

FIG. 4 is a developed view of the finder optical system according to a second embodiment and FIGS. 5A–5C show various aberrations thereof. Specific numerical arrangement of the second embodiment is indicated in Table 2. The basic construction, i.e., an order of positive and negative lens elements, of the second embodiment is identical to the first embodiment.

TABLE 2

$f_2 = 23.362$  $f_3 = 30.381$
$f_{2n} = -13.027$  $f_{3n} = -23.250$
Finder viewing ratio: 100%
Finder magnification: 0.76
Diopter: −1.1/m

| Surface number | r | d | n | ν |
|---|---|---|---|---|
| 1 | 105.000 | 7.400 | 1.56883 | 56.3 |
| 2 | ∞ | 0.000 | — | — |
| 3 | ∞ | 115.862 | 1.56883 | 56.3 |
| 4 | ∞ | 1.500 | — | — |
| 5 | 14.971 | 3.207 | 1.72916 | 54.7 |
| 6 | −36.905 | 2.294 | — | — |
| 7 | −10.478 | 1.500 | 1.80518 | 25.4 |
| 8 | 33.118 | 2.412 | — | — |
| 9 | −11.639 | 1.615 | 1.77250 | 49.6 |
| 10 | −10.768 | 0.200 | — | — |
| 11 | −35.956 | 3.041 | 1.77250 | 49.6 |
| 12 | −15.493 | 0.200 | — | — |
| 13 | 25.845 | 5.562 | 1.77250 | 49.6 |
| 14 | −25.845 | 6.347 | — | — |
| 15 | −11.365 | 1.500 | 1.79952 | 42.2 |
| 16 | 131.954 | 3.426 | — | — |
| 17 | −27.970 | 5.772 | 1.77250 | 49.6 |
| 18 | −13.576 | 9.000 | — | — |
| 19 | 48.202 | 4.369 | 1.83400 | 37.2 |
| 20 | −48.202 | 7.800 | — | — |
| 21 | 29.978 | 1.000 | 1.84666 | 23.8 |
| 22 | 11.701 | 2.905 | — | — |
| 23 | 39.076 | 3.347 | 1.77250 | 49.6 |
| 24 | −39.076 | 6.275 | — | — |
| 25 | −21.839 | 6.727 | 1.77250 | 49.6 |
| 26 | −10.400 | 1.000 | 1.62004 | 36.3 |
| 27 | −17.988 | — | — | — |

Third Embodiment

Figure 6:
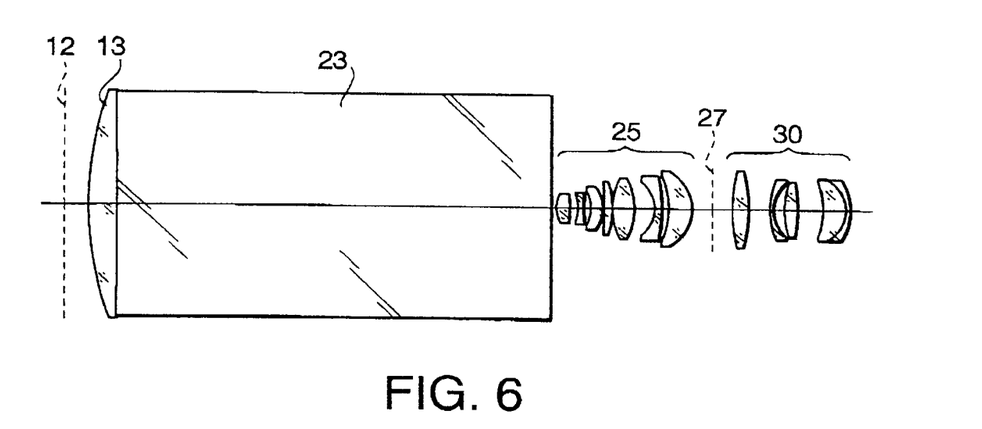
FIG. 6 is a developed view of the finder optical system according to a third embodiment.
Figure 7A:
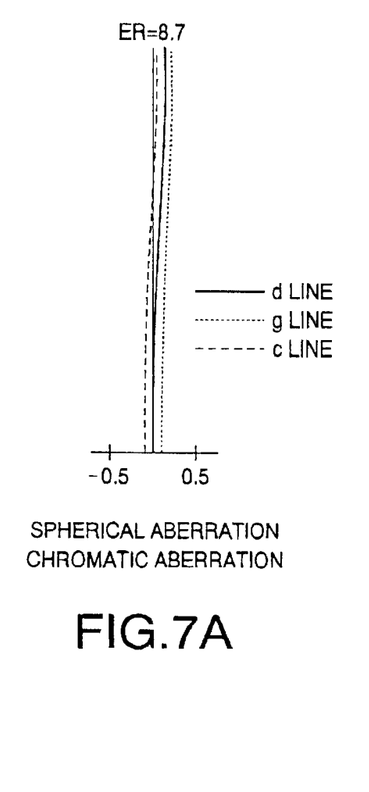
FIGS. 7A–7C are graphs showing spherical aberration, astigmatism and distortion of the finder optical system of the third embodiment, respectively.
Figure 7B:
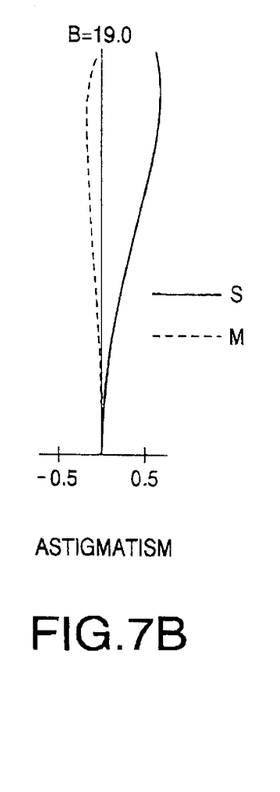
Figure 7C:
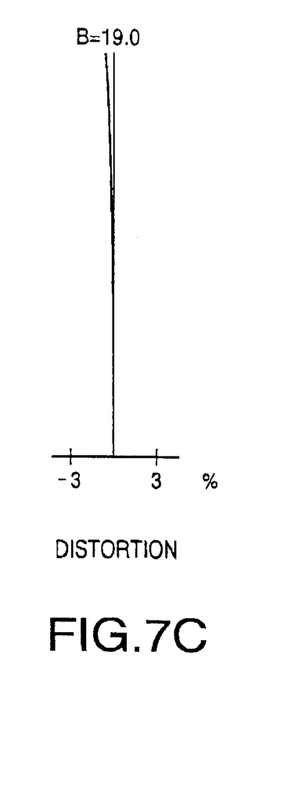

FIG. 6 is a developed view of the finder optical system according to a third embodiment and FIGS. 7A–7C show various aberrations thereof. Specific numerical arrangement of the third embodiment is indicated in Table 3. The basic construction of the third embodiment is identical to the first embodiment.

TABLE 3

$f_2 = 23.513$  $f_3 = 30.115$
$f_{2n} = -15.021$  $f_{3n} = -25.653$
Finder viewing ratio: 100%
Finder magnification: 0.76
Diopter: −1.0/m

| Surface number | r | d | n | ν |
|---|---|---|---|---|
| 1 | 105.000 | 7.400 | 1.56883 | 56.3 |
| 2 | ∞ | 0.000 | — | — |
| 3 | ∞ | 115.862 | 1.56883 | 56.3 |
| 4 | ∞ | 1.500 | — | — |
| 5 | 13.168 | 3.476 | 1.72916 | 54.7 |
| 6 | −37.368 | 2.548 | — | — |
| 7 | −10.778 | 1.300 | 1.80518 | 25.4 |
| 8 | 31.257 | 1.983 | — | — |
| 9 | −13.701 | 3.414 | 1.80400 | 46.6 |
| 10 | −11.458 | 0.200 | — | — |
| 11 | −84.987 | 2.186 | 1.77250 | 49.6 |
| 12 | −35.771 | 0.200 | — | — |
| 13 | 25.288 | 5.761 | 1.77250 | 49.6 |
| 14 | −25.288 | 5.950 | — | — |
| 15 | −10.089 | 1.500 | 1.78590 | 44.2 |
| 16 | −73.980 | 1.958 | — | — |
| 17 | −28.963 | 6.415 | 1.77250 | 49.6 |
| 18 | −13.489 | 11.000 | — | — |
| 19 | 51.915 | 4.310 | 1.83400 | 37.2 |
| 20 | −51.915 | 5.747 | — | — |

TABLE 3-continued $f_2 = 23.513$   $f_3 = 30.115$
$f_{2n} = -15.021$   $f_{3n} = -25.653$
Finder viewing ratio: 100%
Finder magnification: 0.76
Diopter: -1.0/m

| Surface number | r | d | n | v |
|---|---|---|---|---|
| 21 | 25.159 | 1.000 | 1.84666 | 23.8 |
| 22 | 11.444 | 2.933 | — | — |
| 23 | 34.900 | 3.461 | 1.72916 | 54.7 |
| 24 | -65.507 | 6.936 | — | — |
| 25 | -26.968 | 6.221 | 1.77250 | 49.6 |
| 26 | -10.400 | 1.000 | 1.62004 | 36.3 |
| 27 | -19.332 | — | — | — |

Fourth Embodiment

Figure 8:
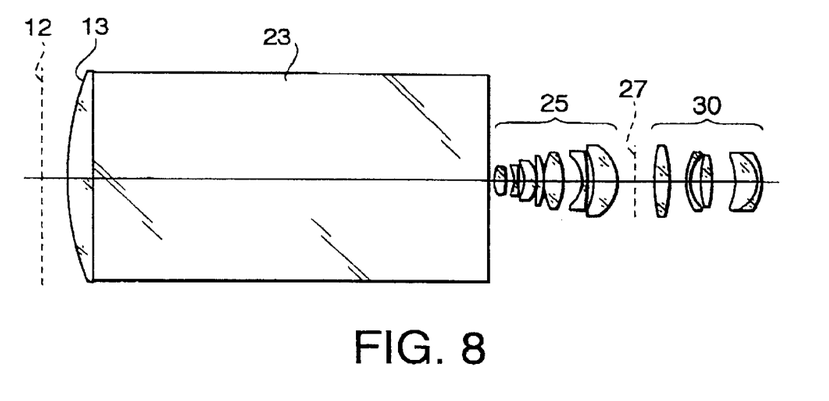
FIG. 8 is a developed view of the finder optical system according to a fourth embodiment.
Figure 9A:
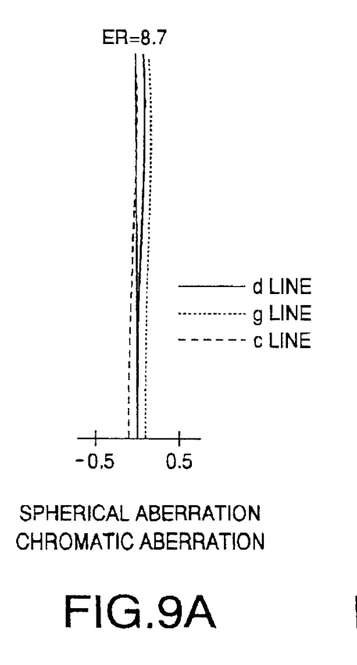
FIGS. 9A–9C are graphs showing spherical aberration, astigmatism and distortion of the finder optical system of the fourth embodiment, respectively.
Figure 9B:
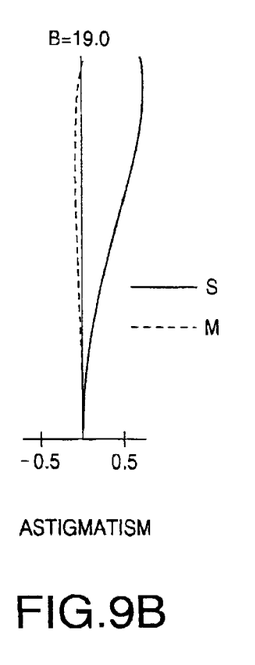
Figure 9C:
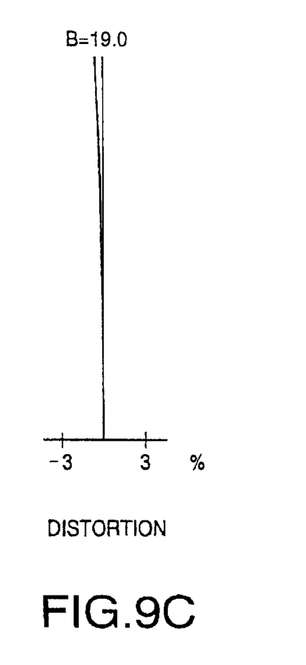

FIG. 8 is a developed view of the finder optical system according to a fourth embodiment and FIGS. 9A–9C show various aberrations thereof. Specific numerical arrangement of the fourth embodiment is indicated in Table 4. The basic construction of the fourth embodiment is identical to the first embodiment.

TABLE 4

$f_2 = 23.395$   $f_3 = 29.953$
$f_{2n} = -15.117$   $f_{3n} = -28.844$
Finder viewing ratio: 100%
Finder magnification: 0.76
Diopter: -1.0/m

| Surface number | r | d | n | v |
|---|---|---|---|---|
| 1 | 105.000 | 7.400 | 1.56883 | 56.3 |
| 2 | ∞ | 0.000 | — | — |
| 3 | ∞ | 115.862 | 1.56883 | 56.3 |
| 4 | ∞ | 1.500 | — | — |
| 5 | 13.206 | 3.425 | 1.72916 | 54.7 |
| 6 | -39.984 | 2.584 | — | — |
| 7 | -10.653 | 1.300 | 1.80518 | 25.4 |
| 8 | 33.742 | 1.808 | — | — |
| 9 | -13.649 | 3.535 | 1.80400 | 46.6 |
| 10 | -11.422 | 0.200 | — | — |
| 11 | -88.349 | 1.970 | 1.77250 | 49.6 |
| 12 | -33.878 | 0.200 | — | — |
| 13 | 25.023 | 5.769 | 1.77250 | 49.6 |
| 14 | -25.023 | 5.542 | — | — |
| 15 | -10.368 | 1.500 | 1.78590 | 44.2 |
| 16 | -86.666 | 2.030 | — | — |
| 17 | -27.308 | 7.000 | 1.78590 | 44.2 |
| 18 | -13.878 | 11.000 | — | — |
| 19 | 51.491 | 4.302 | 1.83400 | 37.2 |
| 20 | -51.491 | 5.139 | — | — |
| 21 | 21.685 | 1.000 | 1.84666 | 23.8 |
| 22 | 11.243 | 3.326 | — | — |
| 23 | 43.274 | 3.180 | 1.72916 | 54.7 |
| 24 | -60.797 | 6.910 | — | — |
| 25 | -26.361 | 6.692 | 1.77250 | 49.6 |
| 26 | -10.400 | 1.000 | 1.63980 | 34.5 |
| 27 | -18.935 | — | — | — |

Fifth Embodiment

Figure 10:
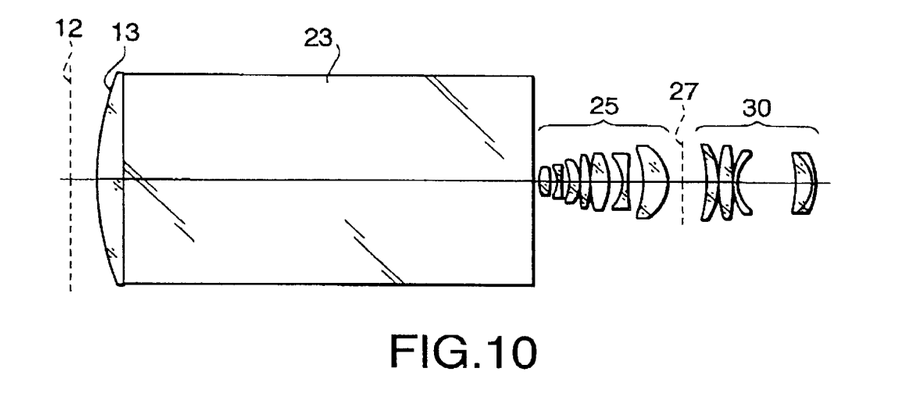
FIG. 10 is a developed view of the finder optical system according to a fifth embodiment.
Figure 11A:
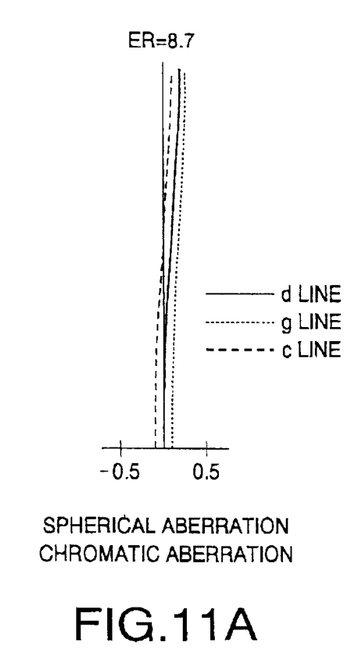
FIGS. 11A–11C are graphs showing spherical aberration, astigmatism and distortion of the finder optical system of the fifth embodiment, respectively.
Figure 11B:
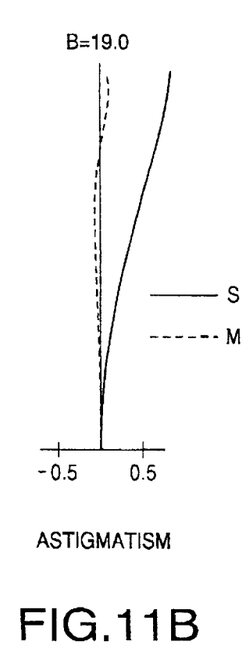
Figure 11C:
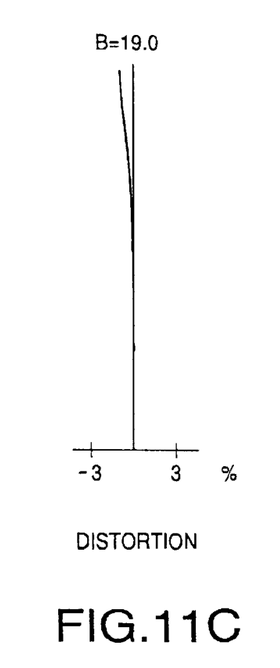

FIG. 10 is a developed view of the finder optical system according to a fifth embodiment and FIGS. 11A–11C show various aberrations thereof. Specific numerical arrangement of the fifth embodiment is indicated in Table 5.

In the finder optical system of the fifth embodiment, the magnifying optical system 30 consists of positive, positive, negative, positive and negative lens elements that are arranged from the side of the second image plane 27 toward the eyepoint. The positive and negative lens elements that are the closest to the eyepoint are cemented to each other. The other basic construction is identical to the first embodiment. The negative lens whose surface numbers are 15 and 16 is the lens defined in the condition (3), and the negative lens whose surface numbers are 23 and 24 is the lens defined in the condition (4).

TABLE 5

$f_2 = 23.7839$   $f_3 = 30.278$
$f_{2n} = -11.625$   $f_{3n} = -34.451$
Finder viewing ratio: 100%
Finder magnification: 0.76
Diopter: -1.0/m

| Surface number | r | d | n | v |
|---|---|---|---|---|
| 1 | 105.000 | 7.400 | 1.56883 | 56.3 |
| 2 | ∞ | 0.000 | — | — |
| 3 | ∞ | 115.862 | 1.56883 | 56.3 |
| 4 | ∞ | 1.500 | — | — |
| 5 | 14.695 | 3.331 | 1.72916 | 54.7 |
| 6 | -32.759 | 2.020 | — | — |
| 7 | -10.179 | 1.300 | 1.80518 | 25.4 |
| 8 | 35.639 | 2.301 | — | — |
| 9 | -15.438 | 3.047 | 1.80400 | 46.6 |
| 10 | -10.931 | 0.200 | — | — |
| 11 | 132.147 | 2.656 | 1.77250 | 49.6 |
| 12 | -36.027 | 0.200 | — | — |
| 13 | 35.926 | 5.459 | 1.77250 | 49.6 |
| 14 | -21.292 | 3.962 | — | — |
| 15 | -11.231 | 1.500 | 1.78590 | 44.2 |
| 16 | 51.840 | 4.549 | — | — |
| 17 | -28.584 | 7.000 | 1.78590 | 44.2 |
| 18 | -13.909 | 10.914 | — | — |
| 19 | -51.359 | 3.377 | 1.85000 | 48.5 |
| 20 | -24.627 | 0.200 | — | — |
| 21 | 40.205 | 3.952 | 1.70000 | 59.3 |
| 22 | -161.366 | 0.150 | — | — |
| 23 | 17.323 | 1.000 | 1.84666 | 23.8 |
| 24 | 10.581 | 16.578 | — | — |
| 25 | -64.954 | 4.804 | 1.77250 | 49.6 |
| 26 | -11.450 | 1.000 | 1.63980 | 34.5 |
| 27 | -22.086 | — | — | — |

The following TABLE 6 shows the relationships between the conditions (1)–(4) and the respective embodiments. Since all of the embodiment satisfy the all of the conditions, the finder optical system of each embodiment has a high finder viewing ratio (100%) and a high finder magnification (0.76).

TABLE 6

| | Embodiment | | | | |
|---|---|---|---|---|---|
| | First | Second | Third | Fourth | Fifth |
| Condition (1) $0.25 < |m_r| < 0.35$ | 0.28 | 0.30 | 0.30 | 0.30 | 0.30 |
| Condition (2) $0.75 < f_2/f_3 < 0.85$ | 0.82 | 0.77 | 0.78 | 0.78 | 0.79 |
| Condition (3) $1.3 < |f_2/f_{2n}| < 2.5$ | 1.73 | 1.79 | 1.57 | 1.55 | 2.05 |
| Condition (4) $0.7 < |f_2/f_{3n}| < 1.5$ | 0.93 | 1.31 | 1.17 | 1.04 | 0.88 |

The present disclosure relates to a subject matter contained in Japanese Patent Application No. 2000-104853, filed on Apr. 6, 2000, which is expressly incorporated herein by reference in its entirety.

What is claimed is:

1. A finder optical system of a single lens reflex camera, comprising:

a relay optical system that forms a second image by erecting an inverted first image formed on a first image plane through a taking lens of a camera, said relay optical system including a condenser lens, a reflecting prism and a relay lens arranged in the order from said first image plane toward an eyepoint; and a magnifying optical system through which said second image is observed under magnification, wherein the following conditions (1) and (2) are satisfied;

(1) $0.25<|m_g|<0.35$ (2) $0.75<f_2/f_3<0.85$ where, $m_r$ is magnification of said relay optical system, $f_2$ is a focal length of said relay lens, and $f_3$ is a focal length of said magnifying optical system.

2. The finder optical system according to claim 1, wherein said relay lens includes at least one positive lens and at least one negative lens that are arranged in the order from said second image plane toward said taking lens, and wherein the following condition (3) is satisfied:

(3) $1.3<|f_2/f_{2n}|<2.5$ where, $f_{2n}$ is a focal length of the negative lens that is the closest to said second image plane in said relay optical system.

3. The finder optical system according to claim 1, wherein said magnifying optical system includes at least one positive lens and at least one negative lens that are arranged in the order from said second image plane toward an eyepoint, and wherein the following condition (4) is satisfied;

(4) $0.7<|f_3/f_{3n}|<1.5$ where, $f_{3n}$ is a focal length of the negative lens that is the closest to said second image plane in said magnifying optical system.

4. The finder optical system according to claim 1, wherein said reflecting prism is a trapezoidal prism.

* * * * *

UNITED STATES PATENT AND TRADEMARK OFFICE
CERTIFICATE OF CORRECTION

PATENT NO.   : 6,430,375 B2
DATED        : August 6, 2002
INVENTOR(S)  : Takayuki Sensui It is certified that error appears in the above-identified patent and that said Letters Patent is hereby corrected as shown below:

<u>Title page,</u>
Item [75], Inventor, "Takayuki Sensut" should be -- Takayuki Sensui --.

Signed and Sealed this

Fourth Day of January, 2003

JAMES E. ROGAN
*Director of the United States Patent and Trademark Office*